(12) United States Patent
Lilly et al.

(10) Patent No.: US 7,949,832 B2
(45) Date of Patent: *May 24, 2011

(54) LATENCY REDUCTION FOR CACHE COHERENT BUS-BASED CACHE

(75) Inventors: Brian P. Lilly, San Francisco, CA (US); Sridhar P. Subramanian, Cupertino, CA (US); Ramesh Gunna, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/714,884

(22) Filed: Mar. 1, 2010

(65) Prior Publication Data
US 2010/0161905 A1 Jun. 24, 2010

Related U.S. Application Data

(63) Continuation of application No. 11/758,219, filed on Jun. 5, 2007, now Pat. No. 7,702,858.

(51) Int. Cl.
*G06F 12/00* (2006.01)
(52) U.S. Cl. ........... 711/141; 711/146; 711/E12.033
(58) Field of Classification Search .............. None
See application file for complete search history.

(56) References Cited

U.S. PATENT DOCUMENTS

| | | | |
|---|---|---|---|
| 5,875,462 A | 2/1999 | Bauman et al. |
| 6,018,792 A | 1/2000 | Jeddeloh et al. |
| 6,519,685 B1 | 2/2003 | Chang |
| 6,647,464 B2 | 11/2003 | Riedlinger et al. |
| 7,111,153 B2 | 9/2006 | Kuttanna et al. |
| 2002/0147889 A1 | 10/2002 | Kruckemyer et al. |
| 2003/0177316 A1 | 9/2003 | Rowlands et al. |
| 2005/0027945 A1 | 2/2005 | Desai |
| 2007/0061519 A1 | 3/2007 | Barrett et al. |
| 2007/0083715 A1 | 4/2007 | Banderpool |

FOREIGN PATENT DOCUMENTS

EP 1280062 1/2003

OTHER PUBLICATIONS

Mark Hayter, "Zen and the Art of SOC Design," Microprocessor Summit 2006, Session MPS-960 High End Processors, P.A. Semi Inc., 14 pages.
James B. Keller, "The PWRficient Processor Family," P.A. Semi Inc., Oct. 2005, 31 pages.
International Search Report in application No. PCT/US2008/065977 mailed Sep. 1, 2008.
Azimi, et al., "Scalability Port: A Coherent Interface for Shared Memory Multiprocessors," Proceedings of the 10th Symposium on High Performance Interconnects Hot Interconnects, Sep. 2002, Intel Corporation, Whole Document.

*Primary Examiner* — Reginald G Bragdon
*Assistant Examiner* — Arvind Talukdar
(74) *Attorney, Agent, or Firm* — Lawrence J. Merkel; Meyertons, Hood, Kivlin, Kowert & Goetzel, PC.

(57) ABSTRACT

In one embodiment, a system comprises a plurality of agents coupled to an interconnect and a cache coupled to the interconnect. The plurality of agents are configured to cache data. A first agent of the plurality of agents is configured to initiate a transaction on the interconnect by transmitting a memory request, and other agents of the plurality of agents are configured to snoop the memory request from the interconnect. The other agents provide a response in a response phase of the transaction on the interconnect. The cache is configured to detect a hit for the memory request and to provide data for the transaction to the first agent prior to the response phase and independent of the response.

15 Claims, 5 Drawing Sheets

LATENCY REDUCTION FOR CACHE COHERENT BUS-BASED CACHE

This application is a continuation of U.S. patent application Ser. No. 11/758,219, filed on Jun. 5, 2007, now U.S. Pat. No. 7,702,858.

BACKGROUND

1. Field of the Invention

This invention is related to processors and coherent systems including processors.

2. Description of the Related Art

Computer systems have generally implemented one or more levels of cache to reduce memory latency. The caches are smaller, higher speed memories than the memory in the main memory system. Typically, caches store recently-used data. For example, caches are often implemented for processor access, and store data recently read/written by the processors in the computer systems. Caches are sometimes implemented for other high speed devices in the computer system as well. In addition to storing recently-used data, caches can be used to store prefetched data that is expected to be used by the processor (or other device).

Caches store copies of data that is also stored in main memory. In multiprocessor systems, and even in single processor systems in which other devices access main memory but do not access a given cache, the issue of cache coherence arises. That is, a given data producer can write a copy of data in the cache, and the update to main memory's copy is delayed. In write-through caches, a write operation is dispatched to memory in response to the write to the cache line, but the write is delayed in time. In a writeback cache, writes are made in the cache and not reflected in memory until the updated cache block is replaced in the cache (and is written back to main memory in response to the replacement).

Because the updates have not been made to main memory at the time the updates are made in cache, a given data consumer can read the copy of data in main memory and obtain "stale" data (data that has not yet been updated). A cached copy in a cache other than the one to which a data producer is coupled can also have stale data. Additionally, if multiple data producers are writing the same memory locations, different data consumers could observe the writes in different orders.

Cache coherence solves these problems by ensuring that various copies of the same data (from the same memory location) can be maintained while avoiding "stale data", and by establishing a "global" order of reads/writes to the memory locations by different producers/consumers. If a read follows a write in the global order, the data read reflects the write.

Cache coherence schemes create an overhead on memory read/write operations. Typically, caches will track a state of their copies according to the coherence scheme. For example, the popular Modified, Exclusive, Shared, Invalid (MESI) scheme includes a modified state (the copy is modified with respect to main memory and other copies); an exclusive state (the copy is the only copy other than main memory); a shared state (there may be one or more other copies besides the main memory copy); and the invalid state (the copy is not valid). The MOESI scheme adds an Owned state in which the cache is responsible for providing the data for a request (either by writing back to main memory before the data is provided to the requestor, or by directly providing the data to the requestor), but there may be other copies in other caches. Thus, the overhead of the cache coherence scheme includes communications among the caches to maintain/update the coherence state. These communications can increase the latency of the memory read/write operations.

The overhead is dependent on the structure of the computer system. More specifically, the overhead depends on the form of interconnect between the various caches and data producers/consumers. In a shared bus system, snooping is often implemented to maintain coherence. A given memory request transmitted on the bus is captured by other caches, which check if a copy of the requested data is stored in the cache. The caches can update the state of their copies (and provide data, if the cache has the most up to date copy). Generally, in a snooping system, the snoopers provide a response in the response phase of the transaction. A source for the data cache can be determined from the response (e.g. the main memory system or a cache with a more coherent copy). Because the snoop response is used to determine the source of the data for a memory transaction, the data transfer is delayed to the snoop response, and thus memory latency can be increased in cases in which the data could otherwise be provided prior to the snoop response (e.g. due to a cache hit).

SUMMARY

In one embodiment, a system comprises a plurality of agents coupled to an interconnect and a cache coupled to the interconnect. The plurality of agents are configured to cache data. A first agent of the plurality of agents is configured to initiate a transaction on the interconnect by transmitting a memory request, and other agents of the plurality of agents are configured to snoop the memory request from the interconnect. The other agents provide a response in a response phase of the transaction on the interconnect. The cache is configured to detect a hit for the memory request and to provide data for the transaction to the first agent prior to the response phase and independent of the response.

In a system comprising a plurality of agents coupled to an interconnect and a cache coupled to the interconnect, wherein the plurality of agents are also configured to cache data, a method is contemplated. The method comprises initiating a transaction by transmitting a memory request on the interconnect from a first agent of the plurality of agents; snooping the memory request from the interconnect by other agents of the plurality of agents; providing a response in a response phase of the transaction on the interconnect by the other agents; detecting a hit for the memory request in the cache; and providing data for the transaction to the first agent prior to the response phase and independent of the response, the data provided by the cache in response to detecting the hit.

In another embodiment, a system comprises a plurality of agents configured to cache data, wherein the plurality of agents are coupled to an interconnect; and a cache coupled to the interconnect. The cache and the plurality of agents are configured to maintain coherence states such that, if the cache detects a hit for a memory request transmitted on the interconnect, the cache is able to provide the data regardless of the state of the data in the plurality of agents. The cache is configured to provide data prior to the response phase corresponding to the memory request is the hit is detected.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Figure 1:
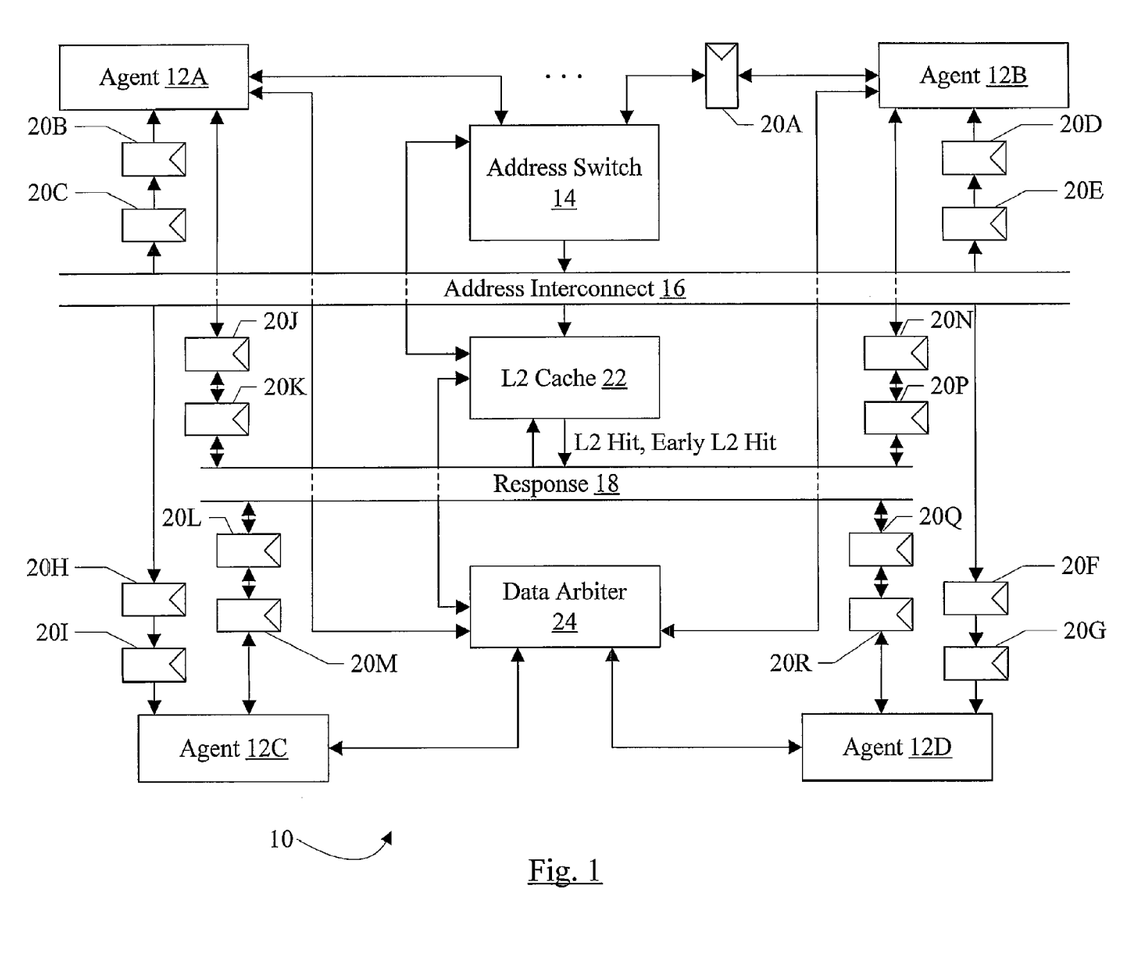
FIG. 1 is a block diagram of one embodiment of a system including one or more agents and a level two (L2) cache.

Turning now to FIG. 1, a block diagram of one embodiment of a system 10 is shown. In the illustrated embodiment, the system 10 includes a plurality of agents such as agents 12A-12D. The system also includes an address switch 14, an address interconnect 16, a response interconnect 18, a level 2 (L2) cache 22, and a data arbiter 24. The agents 12A-12B and the L2 cache 22 are coupled to the address switch 14 (where the agent 12B is coupled through a flop 20A in the illustrated embodiment). The address switch 14 is further coupled to the address interconnect 16, which is coupled to the agents 12A-12D (through flops 20B-20I in the illustrated embodiment). Viewed in another way, the flops 20B-20I may be part of the address interconnect 16. The L2 cache 22 is also coupled to the address interconnect 16, but not through flops in the illustrated embodiment. The agents 12A-12D are also coupled to the response interconnect 18 (through flops 20J-20N and 20P-20R, in the illustrated embodiment). Viewed in another way, the flops 20J-20N and 20P-20R may be part of the response interconnect 18. The L2 cache 22 is also coupled to the response interconnect 18 (again, without flops in the illustrated embodiment). The agents 12A-12D and the L2 cache 22 are coupled to the data arbiter 24. In one embodiment, the system 10 may be integrated onto a single integrated circuit chip. In other embodiments, various components of the system 10 may be implemented on separate integrated circuits. Any level of integration may be used in various embodiments.

The agents 12A-12B may be configured to transmit requests that are to be transmitted on the address interconnect 16 to the address switch 14. Each request may include the address of the transaction and the command (that identifies the transaction to be performed). Various commands may be supported, such as coherent read and write commands, non-coherent read and write commands, coherent ownership commands, synchronization commands, cache management commands, etc. Requests may also include other information in various embodiments. For example, in one embodiment, the requests may include a priority level of the request (for arbitration) and an indication of whether or not the data for this request is to be copied to level 2 cache as well.

The agents 12A-12B may be referred to as source agents, since they may initiate transactions in the system 10 by transmitting a request for the address interconnect 16. Exemplary source agents may include processors, external writeback caches such as the L2 cache 22 (which source write transactions to write evicted cache blocks that have been modified to memory), and input/output (I/O) bridges (which source transactions on behalf of peripheral devices to which they are coupled). As illustrated by the ellipses in FIG. 1, various embodiments may include more than two source agents (or source/target agents, described below). Other agents may not source transactions, but may be the target of a transaction (that is, the agent that receives the transaction and is responsible for the data of the transaction). Such agents are referred to as target agents. For read transactions, the target agent may supply the data unless another agent has a more recent cached copy of the data. For write transactions, the target agent may sink the write data supplied by the source agent. Target agents may include, for example, memory controllers and I/O bridges. Some agents may be both a source agent for some transactions and a target agent for other transactions. Exemplary source/target agents may include the I/O bridge or external cache mentioned above. Generally, an agent may comprise any circuitry that is configured to communicate via transactions on the address interconnect 16 and the response interconnect 18 (and the data interconnect, not shown in FIG. 1). Source agents may often include internal caches (e.g. level one (L1) caches). That is, at least some of the agents 12A-12D in the system are configured to cache data that they have read from memory.

In one embodiment, each source agent 12A-12B (or source/target agent, although source agent will be used for brevity in this description) and the L2 cache 22 may use a request signal to indicate that the source agent 12A-12B/L2 cache 22 is transmitting a request. The address switch 14 may also assert a grant signal to a given source agent 12A-12B/L2 cache 22 to indicate that a request transmitted by that source agent 12A-12B/L2 cache 22 has been granted onto the address interconnect 16. The address switch 14 may include a plurality of storage locations configured to store requests transmitted by the source agents until the requests are granted onto the address interconnect 16. In one embodiment, the storage locations may comprise a plurality of queues. Each queue may correspond to a particular source agent, and may be dedicated to storing requests transmitted by that source agent. That is, there may be a one-to-one correspondence between queues and source agents. The queue for a given source agent may store a plurality of requests transmitted to the address switch 14 by the given source agent. Each source agent may be aware of the number of queue entries in the queue corresponding to that source agent, and may not transmit more requests than there are queue entries.

The address switch 14 may also be configured to arbitrate among the requests in the queues to select a request for transmission on the address interconnect 16. Any arbitration scheme may be employed. For example, in some embodiments, each request may have a priority level assigned to it. The arbitration scheme may be a strict priority scheme (selecting the highest priority request) with starvation prevention mechanisms to avoid starving lower priority requests. The address switch 14 may drive the selected request on the address interconnect 16.

The address interconnect 16 may comprise any communication media, in various embodiments. For example, the address interconnect 16 may comprise a packet interface, in which a request is transmitted as a packet over one or more clock cycles on the address interconnect 16. Particularly, in one embodiment, the address packet may be transmitted in one clock cycle on the address interconnect 16. Such embodiments may insulate the address switch 14, somewhat, from the protocol of the address phase of a transaction. Other embodiments may implement the address interconnect 16 as a bus, with an address transferred along with various control signals to indicate the command and other control information transferred during the address phase. Generally, the address interconnect may be logically viewed as a single unit, to be granted to a source agent for a given transaction transfer as a whole.

Requests are broadcast to agents 12A-12D and the L2 cache 22 on the address interconnect 16. In some embodiments, the flight time on the address interconnect 16 to the farthest agent 12A-12D (in terms of physical distance) may exceed a clock cycle of the clock associated with the address interconnect 16. Flops 20B-20I may be used to capture the request and continue its propagation to the agents 12A-12D. Thus, the number of flops 20B-20I included between the address switch 14 and a given agent 12A-12D may be based on the flight time to the farthest agent (in numbers of clock cycles of the clock signal used for the address interconnect 16). In the illustrated embodiment, the flight time exceeds two clock cycles and thus two flops are used. Other embodiments may include zero flops (if the flight time is less than a clock cycle), one flop (if the flight time exceeds one clock cycle but is less than two clock cycles), or more than two flops (dependent on the flight time). To ensure that a given request is logically received by each agent 12A-12D on the same clock cycle, an equal number of flops 20B-20I may be provided between the address switch 14 and each agent 12A-12D even though some agents may be physically nearer to the address switch 14 and the request may be physically capable of arriving at the nearer agent in a shorter flight time. Thus, the address interconnect 16 is referred to as a staged interconnect, since the transmitted address commands are staged through the flops to the destinations. The flops 20B-20I to the farther agents may be physically distributed along the distance between the address switch 14 and the farther agents. FIG. 1 does not attempt to illustrate the physical distribution of the flops 20B-20I, for simplicity in the drawing.

Since each agent 12A-12D logically receives the requests transmitted on the address interconnect 16 on the same clock cycle, the address interconnect 16 may, in some embodiments, be the point of coherency in space for coherent transactions. That is, the order of requests successfully transmitted on the address interconnect 16 may define the order of transactions for coherency purposes.

The agents 12A-12D and the L2 cache 22 may also be coupled to the response interconnect 18 for communicating the response phase of transactions initiated via requests on the address interconnect 16. The response phase may include, for example, responses from caching agents for coherent transactions. The responses may provide information indicating which coherency state should be established in the receiver of data corresponding to a transaction. In some embodiments, a "retry" protocol may be employed in which a responding agent can indicate that a request needs to be reattempted later (and it cancels the current transaction). Other embodiments may not employ retries.

Figure 2:
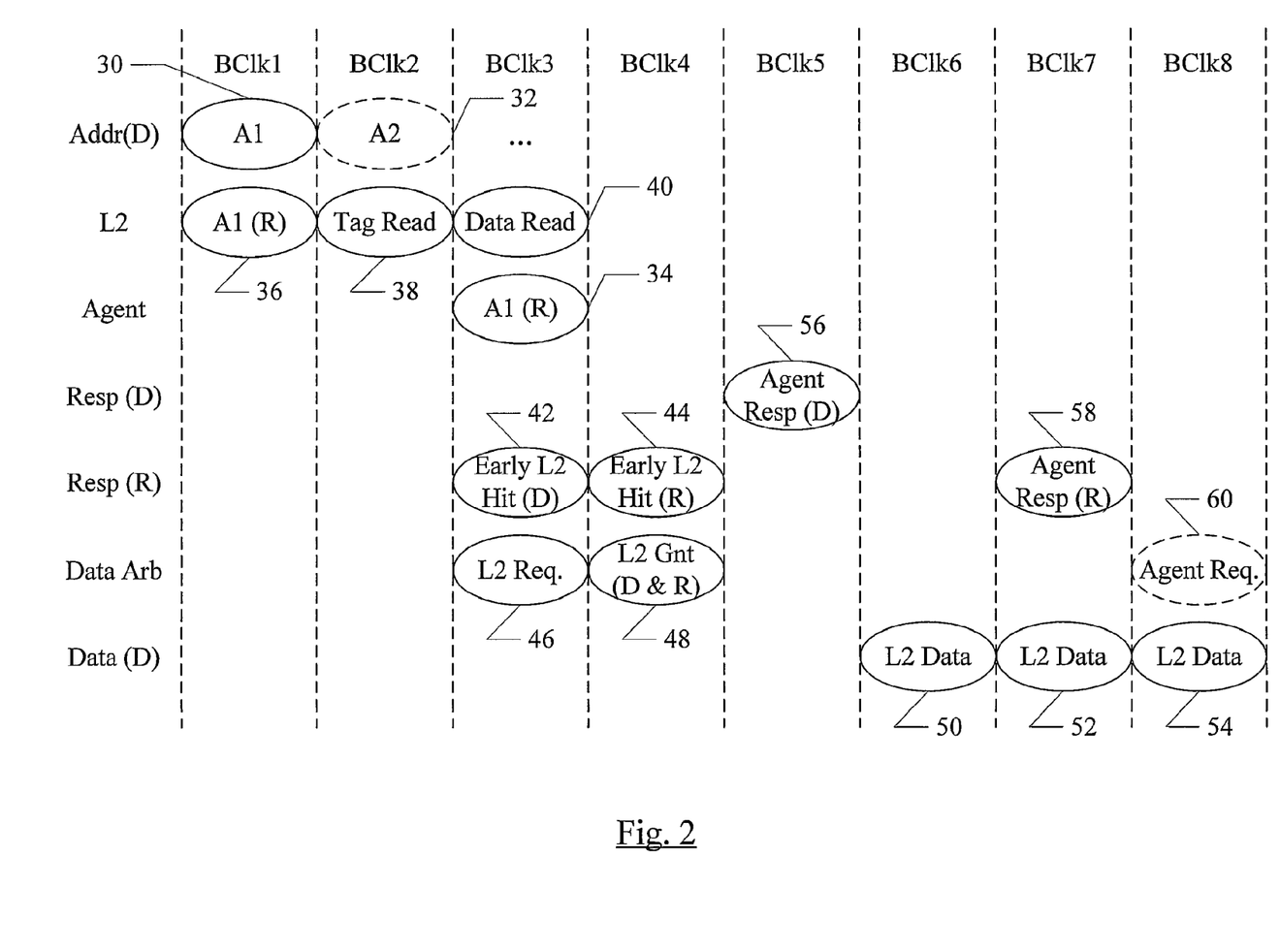
FIG. 2 is a timing diagram illustrating operation of one embodiment of the system.

In the illustrated embodiment, the response phase may be staged as well (through flops 20J-20N and 20P-20R). The staging may be two flops in length (total, from transmitter to receiver) in the present embodiment, for a delay of two clocks from driving a response to receiving a response. The delay is illustrated in FIG. 2 as two flops from each agent to the response interconnect 18, but is not meant to imply a delay of 4 clocks total for the illustrated embodiment.

Once the response phase has occurred for a given transaction, the source of the data for the transaction is known (e.g. it may be a memory controller, or it may be a caching agent that has a more coherent copy of the data). In one embodiment, the response phase may include a hit signal (indicating that a copy exists in at least one cache) and a hit modified (HitM) signal indicating that a modified copy exists in a cache. The modified copy may be in the M state, or the O state in the MOESI protocol.

While having each agent 12A-12D logically receive the requests transmitted on the address interconnect 16 on the same clock cycle may simplify coherence management in the system 10, memory latency may also be higher than it would otherwise be if the staging were not performed. Specifically, the response phase of the transaction initiated by the request may be delayed both by the staging of the request transmission and the staging of the response. Thus the source of the data (e.g. the memory controller or a cache that has a more coherent copy than memory) is not known for a longer period of time than if staging is not performed (e.g. 4 clocks later, in this embodiment). For read requests (which request a transfer of data to the requestor), the latency may reduce performance because the requestor may need the data to continue processing. For example, a processor may have executed a load instruction that caused the read request, and any instructions depending on the load result may be delayed until the data is provided.

The L2 cache 22 may be an agent on the address interconnect 16 as well, but may not be staged like other agents. In other embodiments, the L2 cache 22 may be staged, but may be staged through fewer flops than other agents. Accordingly, the L2 cache 22 may receive each request on the address interconnect 16 before other agents (e.g. one or more bus clock cycles earlier). The L2 cache 22 may snoop the transmission and may, for read operations, supply the data if the L2 cache 22 detects a hit for the data. Particularly, the L2 cache 22 may supply the data before the response phase of the transaction occurs (although the data may not be completely transferred before the response phase), or at least before the staged response is provided to all agents. Thus, memory latency may be reduced in cases in which an L2 cache hit is detected.

In one embodiment, a set of caching policies for the L2 cache and L1 caches in the agents 12A-12D may permit the L2 cache 22 to supply data in response to a hit, without knowing the response of other agents. The policies may be designed to ensure that, if the L2 cache stores a copy of a block, that copy is the most coherent copy in the system 10 (i.e. it is most up to date). Thus, the response phase will be consistent with the L2 cache 22 supplying the data. Viewed in another way, if an L2 cache hit is detected, L1 caches may have the data in only the shared or the invalid state, for one embodiment implementing MESI or MOESI coherence schemes.

In one embodiment, the L2 cache 22 may act as a victim cache for data requests, and may be inclusive of instruction fetch requests from processors. If a request hits in the L2 cache, and the resulting state in the requestor would cause the requestor to provide the data in response to a subsequent snoop, the L2 cache may invalidate the L2 cache entry storing the block. Viewed in another way, if the resulting state in the requestor is a potentially modifiable state (e.g. exclusive, modified, or owned), the L2 cache may invalidate its cache entry. Viewed in still another way, if the resulting state in the requestor indicates that the requestor has the most coherent copy, the L2 cache may invalidate its cache entry.

In one embodiment, the L1 caches may be configured to write back exclusive blocks that are evicted, similar to the write back performed for modified or owned blocks. The L2 cache 22 may allocate an entry for the exclusive blocks, and thus may capture a copy that may have been invalidated with the L1 cache took the copy exclusive. If the L2 copy indication is not set for a request, as mentioned above, an L1 data cache fill from memory may generally not cause a fill into the L2 cache 22. Instruction cache fills may be cached in the L2 cache 22, since the instruction cache is not normally modified.

The data arbiter 24 may be configured to arbitrate among requests to use a data interconnect (not shown in FIG. 1). The L2 cache 22 may assert a request to the data arbiter 24 to supply data for a memory request, including to supply data to a memory request in response to detecting a hit before the response phase. In some embodiments, the L2 cache 22 may be configured to assert a request to the data arbiter 24 speculatively, while the tag lookup for a request is occurring. If the data interconnect is granted to the L2 cache 22 and the speculation is correct, the data may be supplied with even lower latency.

The L2 cache 22 may provide an L2 hit signal on the response interconnect 18, signalling that the L2 cache 22 will be providing the data. The L2 cache 22 may also provide an early L2 hit signal before the response phase, indicating to the requestor that data may be provided early for the request (if the L2 cache 22 is granted use of the data interconnect). In one embodiment, the data interconnect may be a hierarchical switched crossbar, although any interconnect may be used in various embodiments (e.g. shared bus, point to point, etc.). The early L2 hit and L2 hit signals may be encoded responses, in other embodiments.

In some embodiments, a flight time of a request from a source agent 12A-12B to the address switch 14 may also exceed a clock cycle. In some embodiments, the address switch 14 may be physically placed nearest the source agents that are expected to have the highest bandwidth of requests (e.g. processor agents may typically have higher request bandwidth than cache agents are I/O agents). In the embodiment of FIG. 1, the flight time of requests from the source agent 12B may exceed a clock cycle, and thus the flop 20A may be used to capture the request and continue its propagation to the address switch 14. Similarly, the grant signal returned by the address switch 14 may be captured by the flop 20A and propagated on the following clock cycle.

Since, in the present embodiment, the address interconnect 16 is the point of coherency for coherent transactions (and may also define the order for requests as a whole), there is no ordering among requests transmitted to the address switch 14 from different agents. Accordingly, if a flop such as flop 20A is used for a flight time from one source agent, flops need not be inserted for other agents whose flight time for requests is less than a clock cycle.

As mentioned above, source agents may receive requests on the address interconnect 16, in some embodiments, to determine which request of multiple requests outstanding in the address switch 14 from a given agent was actually granted on to the address interconnect 16. Additionally, in some embodiments, source agents which may also cache data (and thus may participate in coherent transaction) may also snoop other source agent's requests on the address interconnect 16 for coherency purposes. Target agents, such as agents 12C-12D, are coupled to the address interconnect 16 to receive requests for which they are the target.

In one embodiment, the address switch 14 may also be configured to manage flow control to various target agents 12C-12D. For example, the address switch 14 may be configured to determine which target agent is addressed by each request (e.g. via coarse-grain decode of the request address and mapping the address to a target agent based on the decode). The address switch 14 may be aware of the number of requests that may be queued in a target agent (after receipt of the requests from the address interconnect 16) and may ensure that the target agent's input queues are not overflowed with requests. If a given request is targeted to a given target agent whose input queue is full, the address switch 14 may ensure that the given request is not selected as the winner of arbitration until an input queue entry is available in the given target agent. The address switch 14 may be non-blocking of other requests in such a situation. That is, the address switch 14 may still be able to select another request targeted at another target agent if an earlier request or higher priority request is not eligible to win arbitration due to the target agent not being able to receive the request. In some embodiments, the address switch 14 may also attempt to implement fairness or optimize access to a target agent among the source agents.

It is noted that, while the flops 20A-20N and 20P-20R are illustrated in the embodiment of FIG. 1, generally any clocked storage device may be used as the devices 20A-20N and 20P-20R. For example, registers, latches, etc. may be used. A clocked storage device may comprise any storage device that is configured to capture a value for storage responsive to a clock signal. In the present embodiment, the clock signal input for the flops 20A-20N and 20P-20R may be the clock used for the address interconnect 16. Some agents may operate internally at multiples of the clock. Other flops described herein may also be implemented with any clocked storage device. Generally, each flop 20A-20N and 20P-20R may have a bit width equal to the width of its input. For example, the flop 20A may be the width of the request/grant interface to the address switch 14 and the width of the flops 20B-20N and 20P-20R may be the width of the address interconnect 16.

While a strict priority arbitration scheme is used as an example above, other embodiments may implement other arbitration schemes. For example, other arbitration schemes may include round-robin, priority weighted round-robin, combinations of round-robin and priority schemes, etc.

Turning now to FIG. 2, a timing diagram is shown illustrating operation of one embodiment of the system 10 for a transaction. Bus clock cycles (BClk) are delimited by vertical dashed lines and are labeled at the top (BClk1 to BClk8). In FIG. 2, a parenthetical "D" or "R" may indicate when a given value or signal is driven (D) or received (R).

The address switch 14 may drive a request addressed to address A1 on the address interconnect 16 in BClk1 (reference numeral 30). The address interconnect 16 may be fully pipelined in this embodiment, and thus another request (addressed to address A2) may optionally be driven in BClk2 (reference numeral 32). The request for A1 is received at an agent in BClk3 (reference numeral 34). However, the L2 cache 22 receives the request for A1 in BClk1 (reference numeral 36).

The L2 cache 22 may perform a tag read for the request in BClk2 (reference numeral 38) and may perform a corresponding data read in BClk3 (reference numeral 40). In one embodiment, the L2 cache 22 may include error correction code (ECC) protection for the tag and data memories, and thus may perform ECC checks in the clock cycles following the tag read and data read, respectively. The L2 cache 22 may detect a cache hit for the request, and may drive the early L2 hit response in BClk3 (reference numeral 42). The requesting agent may receive early L2 hit signal in BClk4, and thus may be informed that data will potentially be provided early (before the response phase) for the current transaction (reference numeral 44). In other embodiments, the early L2 hit response may be driven and received in the same clock cycle.

The L2 cache 22 may also drive a request to the data arbiter 24 in BClk3 (reference numeral 46), and may receive a grant from the data arbiter 24 in BClk4 (reference numeral 48). The L2 cache 22 supplies data in BClk6 to BClk8 (and perhaps additional clock cycles, not shown—reference numerals 50, 52, and 54). For example, in one embodiment, a cache block of data may be transferred over 4 bus clock cycles (4 beats). Other embodiments may use more or fewer beats to transfer a cache block.

In the illustrated embodiment, a receiving agent 12A-12D may determine its response to the request (received in BClk3, reference numeral 34), and may drive the response in BClk5 (reference numeral 56). The response may be received at the source agent of the transaction in BClk7 (reference numeral 58), which is after the L2 cache data is being supplied in this case. If an L2 miss is detected, the agent that is to provide the data may assert its data request in BClk8 (reference numeral 60), or perhaps even later, depending on the latency for the providing agent to obtain the data (e.g. from memory, if the providing agent is the memory controller, or from a cache, if the providing agent is a snooper). Thus, the latency may be reduced by a minimum of 5 clock cycles in this embodiment (the difference between the L2 data arbitration request in BClk3 and the agent data arbitration request in BClk8).

It is noted that, while specific timings are shown in FIG. 2, the timings may be varied from embodiment to embodiment, as desired.

Figure 3:
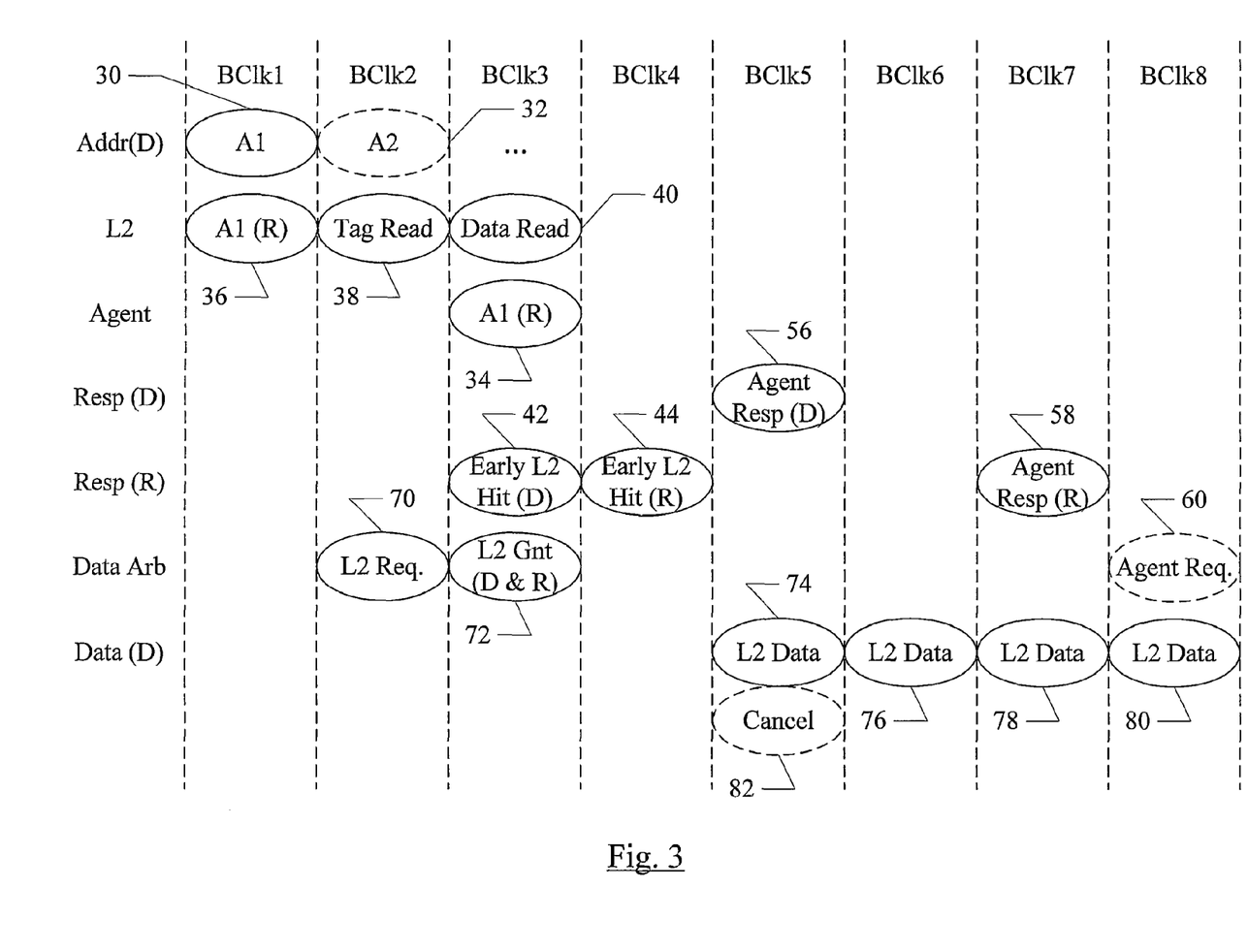
FIG. 3 is a timing diagram illustrating operation of another embodiment of the system.

FIG. 3 is a timing diagram illustrating operation of a second embodiment of the system 10 for a transaction. The timings in FIG. 3 for the request, the L2 cache receiving the request and performing the tag read and data read, the agent receiving the request and driving the response, the response being received, and the early L2 hit drive and receive may be the same as in FIG. 2 (reference numerals 30, 32, 34, 36, 38, 40, 42, 44, 56, 58 and 60). However, in this embodiment, the L2 cache 22 may be configured to speculatively request the data interconnect from the data arbiter, in response to receiving the request (reference numeral 70). If the request is granted (reference numeral 72), then the data may be supplied earlier as well (reference numerals 74, 76, 78, and 80). If the request is granted by the L2 cache 22 detects a miss, a cancel may be provided with the first data transferred to indicate to the source agent that the data is not valid (reference numeral 82). Alternatively, the transfer may simply be cancelled, and no data may be driven.

Figure 4:
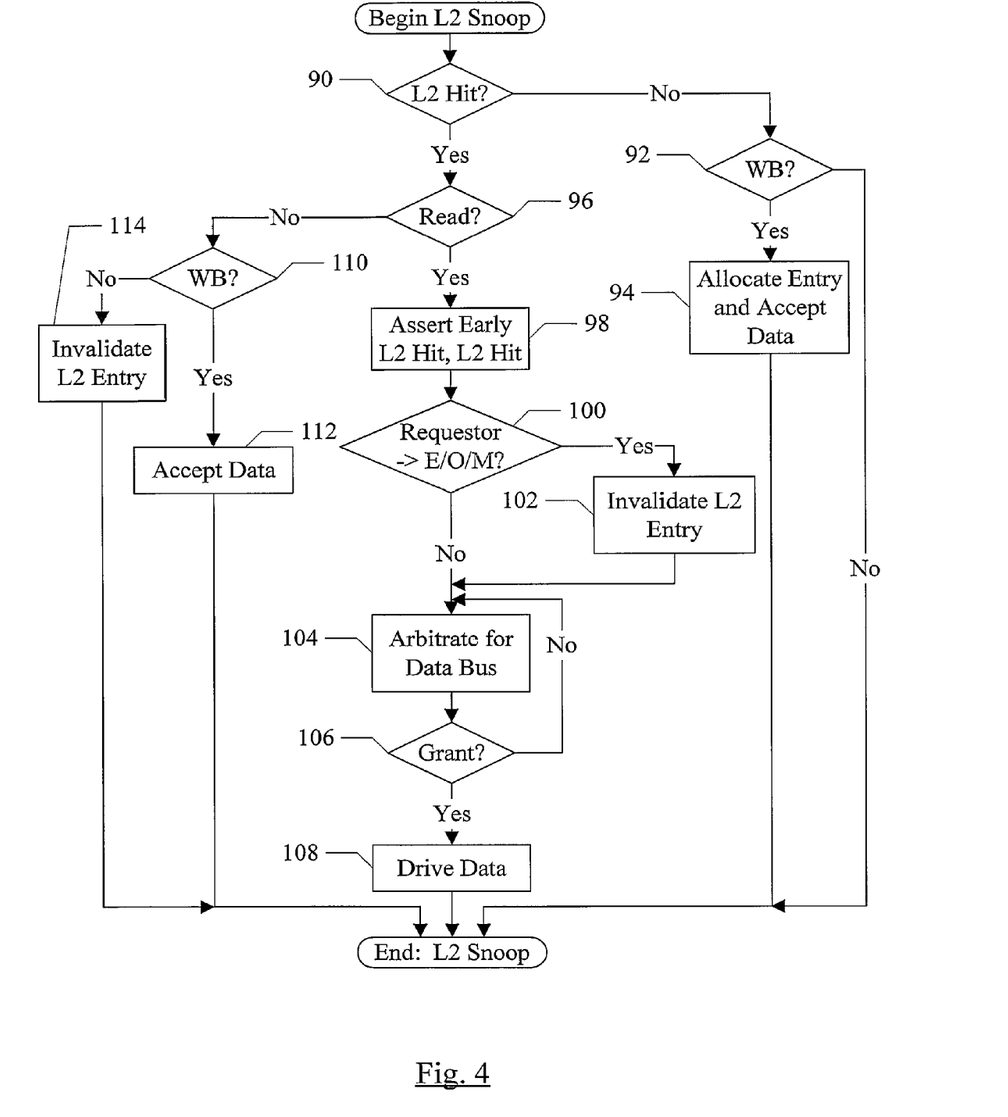
FIG. 4 is a flowchart illustrating operation of one embodiment of the L2 cache in response to a snoop.

Turning now to FIG. 4, a flowchart is shown illustrating operation of one embodiment of the L2 cache 22 in response to snooping a memory request from the address interconnect 16. While the blocks are shown in a particular order for ease of understanding, other orders may be used. Blocks may be performed in parallel in combinatorial logic in the L2 cache 22. Blocks, combinations of blocks, and/or the flowchart as a whole may be pipelined over multiple clock cycles.

The L2 cache 22 may read the tag memory and determine if the snoop is a hit (decision block 90). If the snoop is a miss (decision block 90, "no" leg), and the snoop request is not a writeback (decision block 92, "no" leg), the L2 cache 22 may not take any additional action for the snoop. If the snoop is a miss (decision block 90, "no" leg) but the snoop is a writeback (decision block 92, "yes" leg), the L2 cache 22 may allocate an entry and accept the writeback data into the allocated entry (block 94). The state for the entry may be exclusive, modified, or owned (the same state as the evicting agent had for the data).

If the snoop is a hit (decision block 90, "yes" leg), and the snoop is a read request (decision block 96, "yes" leg), the L2 cache 22 may respond with data. Thus, the L2 cache 22 may assert the early L2 hit response (block 98). Additionally, the L2 cache 22 may assert the L2 hit response during the response phase, and may also assert HitM if the L2 cache 22 is storing a modified copy. If the requestor takes the line in Exclusive (E), Owned (O), or modified (M) state (decision block 100, "yes" leg), the L2 cache 22 may invalidate the hitting L2 entry (block 102). The requestor may require the block in E, O, or M state by transmitting a particular request type (e.g. a read to own or read to modify request). Additionally, the requestor may acquire the block in E, O, or M state if the responses in the response phase indicate that the block may be taken in that state, even if the request did not require it (e.g. a read shared or read block request that is not cached in other agent's caches). If the requestor does not acquire the block in E, O, or M state, then the L2 cache 22 may update its state to shared with the exception of a read to share request if the L2 cache 22 has the block in owned or modified state (in which case the state is updated to owned).

Because the L2 cache 22 detects a hit, the L2 cache 22 may arbitrate for the data interconnect (block 104). In some embodiments, the L2 cache 22 may arbitrate speculatively for the data bus in response to snooping a cacheable, coherent transaction request. Other embodiments may only arbitrate in response to detecting the hit. If the data arbiter 24 grants the data interconnect to the L2 cache (decision block 106, "yes" leg), the L2 cache may drive the data to the requestor (block 108). Otherwise (decision block 106, "no" leg), the L2 cache may continue arbitrating for the data interconnect.

If the snoop is a hit (decision block 90, "yes" leg), and the snoop is not a read request (decision block 96, "no" leg), but the request is a writeback request (decision block 110, "yes" leg), the L2 cache 22 may accept the writeback data into the hitting entry (block 112) and may update the state of the hitting entry to modified, exclusive, or owned (the same state as the cache that transmitted the writeback). For non-read, non-writeback requests (decision block 110, "no" leg), the L2 cache 22 may invalidate the hitting L2 cache entry (block 114). The non-read, non-writeback requests may include requests to change a block to dirty (modified status), such as a store hit to a non-exclusive, non-modified block; requests to own a block; invalidate requests; non-cacheable write requests, etc.

Figure 5:
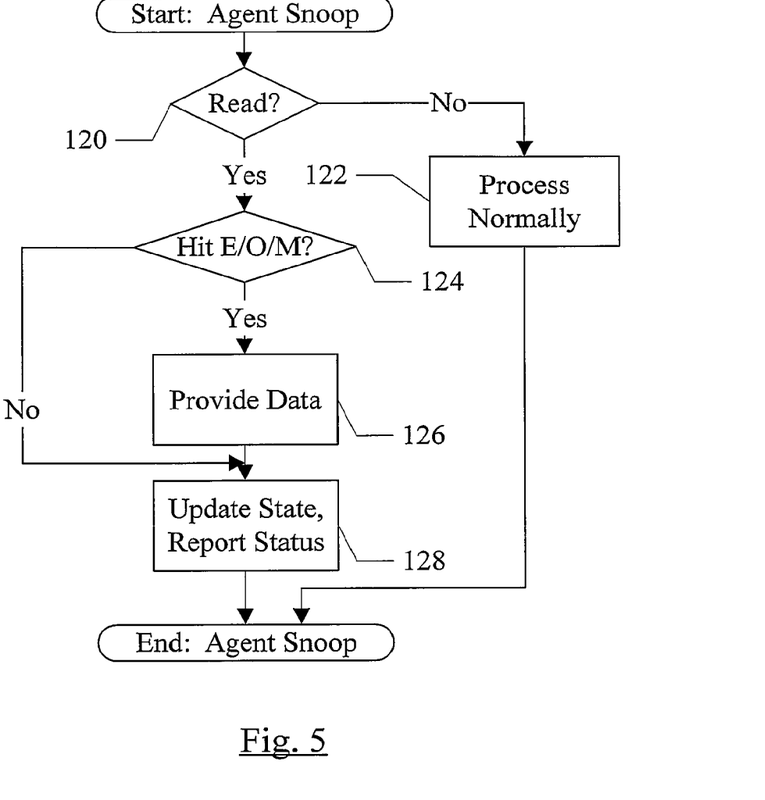
FIG. 5 is a flowchart illustrating operation of one embodiment of an agent in response to a snoop.

Turning now to FIG. 5, a flowchart is shown illustrating operation of one embodiment of an agent (e.g. one of agents 12A-12D) that caches data in response to snooping a memory request from the address interconnect 16. While the blocks are shown in a particular order for ease of understanding, other orders may be used. Blocks may be performed in parallel in combinatorial logic in the agent. Blocks, combinations of blocks, and/or the flowchart as a whole may be pipelined over multiple clock cycles.

If the request is not a read (decision block 120, "no" leg), the snoop may be processed normally (block 122). The processing may include invalidating the block, writing the block back to memory if modified, etc. If the request is a read (decision block 120, "yes" leg) and the snoop hits in the agent in E, O, or M state (decision block 124, "yes" leg), then the agent may provide the data for the transaction (block 126). In either case, the agent may update the state of the cache block in the cache (if any) and provide the response in the response phase (block 128).

Figure 6:
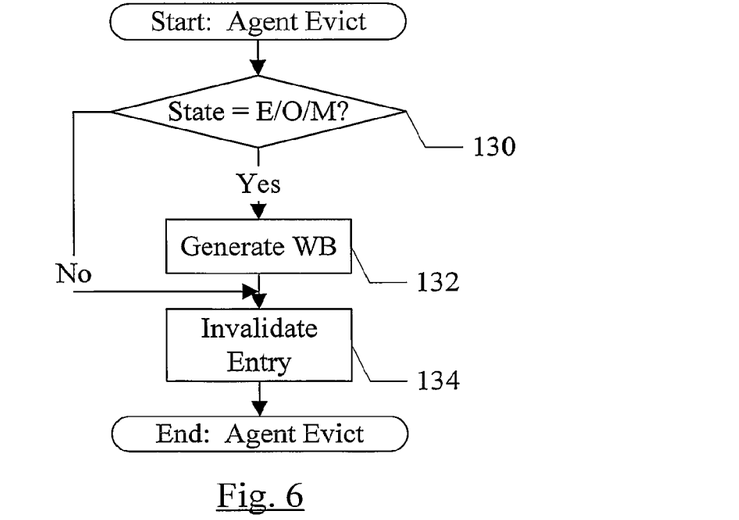
FIG. 6 is a flowchart illustrating operation of one embodiment of an in response to evicting a cache block.

Turning now to FIG. 6, a flowchart is shown illustrating operation of one embodiment of an agent (e.g. one of agents 12A-12D) that caches data in response to evicting a block from its cache. While the blocks are shown in a particular order for ease of understanding, other orders may be used. Blocks may be performed in parallel in combinatorial logic in the agent. Blocks, combinations of blocks, and/or the flowchart as a whole may be pipelined over multiple clock cycles.

If the state of the block is E, O, or M (decision block 130, "yes" leg), the agent may generate a writeback request to write the block back to memory (or more particularly, to the L2 cache 22 in this embodiment) (block 132). In either case, the agent may invalidate the cache entry from which the block has been evicted.

Numerous variations and modifications will become apparent to those skilled in the art once the above disclosure is fully appreciated. It is intended that the following claims be interpreted to embrace all such variations and modifications.

What is claimed is:

1. A system comprising:
a plurality of agents configured to cache data, wherein the plurality of agents are coupled to an interconnect that comprises an address interconnect and a data interconnect, and wherein the plurality of agents are configured to source memory requests on the address interconnect;
a cache coupled to the interconnect; and
a data arbiter configured to arbitrate requests for the data interconnect from the cache and the plurality of agents, and wherein the cache is coupled to the data arbiter and, in response to receiving from the address interconnect a memory request that is sourced by one of the plurality of agents, the cache is configured to speculatively request the data interconnect prior to determining whether or not the memory request is a hit in the cache, and wherein the data arbiter is configured to grant the data interconnect to the cache in response to the speculative request and further in response to determining that the cache wins the arbitration over one or more of the plurality of agents that are requesting the data interconnect, and wherein the cache is configured to detect the cache hit for the memory request, and wherein the cache is configured to transmit a first cache hit response prior to a response phase of the memory request on the interconnect to indicate the cache hit, and wherein the cache is further configured to transmit a second cache hit response on the interconnect during the response phase of the memory request.

2. The system as recited in claim 1 wherein the cache is configured to transmit a cancel indication on the data interconnect to indicate that the speculation was incorrect in response to receiving the grant from the data arbiter for the speculative request and further in response to detecting that the memory request is a miss in the cache.

3. The system as recited in claim 1 wherein at least a portion of the data corresponding to the memory request is transmitted to a source agent of the plurality of agents that sourced the memory request prior to the source agent receiving the response phase of the memory request on the interconnect.

4. The system as recited in claim 3 wherein other agents of the plurality of agents excluding the source agent are configured to snoop the memory request from the address interconnect and provide a response in the response phase on the interconnect.

5. The system as recited in claim 3 wherein the cache is configured to invalidate the data from a cache entry storing the data in response to the source agent acquiring the data in a modifiable coherence state, even in a case that the source agent did not request the modifiable coherence state.

6. The system as recited in claim 5 wherein the state comprises one of the exclusive, modified, or owned states.

7. The system as recited in claim 1 wherein a given agent of the plurality of agents, in response to evicting a cache block that is in an exclusive state but unmodified, is configured to generate a writeback transaction for the cache block.

8. The system as recited in claim 7 wherein the cache is configured to allocate a cache entry in response to the writeback transaction and to accept the cache block into the entry.

9. A cache comprising a cache memory configured to store cache blocks and circuitry coupled to receive a memory request, wherein the cache is configured to speculatively arbitrate for a data interconnect to transfer data corresponding to the memory request prior to detecting whether or not the memory request is a hit in the cache memory, wherein the data interconnect is used by a plurality of agents to transfer data among the plurality of agents and the cache, and wherein the cache is configured to initiate a data transfer on the data interconnect responsive to receiving a grant of the data interconnect for the speculative arbitration and further in response to detecting a hit for the memory request, wherein the cache is configured to transmit a first cache hit response prior to a response phase of the memory request on the interconnect to indicate the cache hit, and wherein the cache is further configured to transmit a second cache hit response on the interconnect during the response phase of the memory request.

10. The cache as recited in claim 9 wherein the circuitry is configured to transmit a cancel indication on the data interconnect to indicate that the speculation was incorrect in response to receiving the grant and further in response to detecting that the memory request is a miss in the cache memory.

11. The cache as recited in claim 9 wherein the circuitry is coupled to receive a copy of a cache block evicted from an agent, wherein the cache block is not modified with respect to a copy in memory, and wherein the circuitry is configured to allocate an entry in the cache memory and is configured to store the cache block in the entry.

12. A cache coupled to receive an address phase of a transaction on an interconnect, wherein the cache is configured to detect a cache hit for the transaction, and wherein the cache is configured to transmit a first cache hit response prior to a response phase of the transaction on the interconnect to indicate the cache hit, and wherein the cache is further configured to transmit a second cache hit response on the interconnect during the response phase of the transaction.

13. The cache as recited in claim 12 further configured to transmit at least a portion of the data corresponding to the transaction prior to the response phase of the transaction.

14. The cache as recited in claim 12 further configured to speculatively arbitrate for a data phase on the interconnect prior to detecting the cache hit.

15. The cache as recited in claim 12 further configured to invalidate a cache block hit by the transaction responsive to transmitting a modifiable copy of the cache block to a requesting agent that initiated the transaction.

* * * * *